United States Patent [19]

Gatto

[11] Patent Number: 5,859,416
[45] Date of Patent: *Jan. 12, 1999

[54] FUEL PUMP SYSTEM WITH AUTOMATED TRANSACTION PROCESSING

[76] Inventor: James G. Gatto, 1101 Mountain Hope Ct., Great Falls, Va. 22066

[*] Notice: The term of this patent shall not extend beyond the expiration date of Pat. No. 5,546,523.

[21] Appl. No.: 641,422

[22] Filed: May 1, 1996

[51] Int. Cl.$^6$ .................................................. G07B 15/02
[52] U.S. Cl. .......................................... 235/384; 235/380
[58] Field of Search .................................. 235/384, 381, 235/380; 902/22

[56] References Cited

U.S. PATENT DOCUMENTS

| | | | |
|---|---|---|---|
| 3,655,947 | 4/1972 | Yamamoto et al. | 235/380 |
| 3,778,595 | 12/1973 | Hatanaka et al. | 235/379 |
| 3,931,497 | 1/1976 | Gentile et al. | 235/381 |
| 4,197,986 | 4/1980 | Nagata | 235/379 |
| 4,225,779 | 9/1980 | Sano et al. | 235/379 |
| 4,314,352 | 2/1982 | Fought | 364/900 |
| 4,319,336 | 3/1982 | Anderson et al. | 364/900 |
| 4,360,728 | 11/1982 | Drexler | 235/462 |
| 4,460,960 | 7/1984 | Anderson et al. | 364/200 |
| 4,484,304 | 11/1984 | Anderson et al. | 364/900 |
| 4,511,970 | 4/1985 | Okano et al. | 364/401 |
| 4,593,183 | 6/1986 | Fukatsu | 235/379 |
| 4,608,485 | 8/1986 | Miura | 235/379 |
| 4,650,977 | 3/1987 | Couch | 235/379 |
| 4,660,168 | 4/1987 | Grant et al. | 364/900 |
| 4,900,903 | 2/1990 | Wright et al. | 235/380 |
| 4,900,906 | 2/1990 | Pusic | 235/381 |
| 4,959,788 | 9/1990 | Nagato et al. | 364/408 |
| 5,010,238 | 4/1991 | Kadono et al. | 235/379 |
| 5,132,521 | 7/1992 | Smith et al. | 235/382 |
| 5,144,115 | 9/1992 | Yoshida | 235/379 |
| 5,175,416 | 12/1992 | Mansvelt et al. | 235/379 |
| 5,202,549 | 4/1993 | Decker et al. | 235/379 |
| 5,265,033 | 11/1993 | Vajk et al. | 364/514 |
| 5,327,066 | 7/1994 | Smith | 320/2 |
| 5,340,969 | 8/1994 | Cox | 235/381 |
| 5,343,906 | 9/1994 | Tibbals, III | 141/83 |
| 5,389,773 | 2/1995 | Coutts et al. | 235/379 |
| 5,434,395 | 7/1995 | Storck et al. | 235/380 |
| 5,484,988 | 1/1996 | Hills et al. | 235/380 X |
| 5,521,363 | 5/1996 | Tannenbaum | 235/379 |
| 5,546,523 | 8/1996 | Gatto | 395/156 |

*Primary Examiner*—Anita Pellman Gross
*Assistant Examiner*—Karl Frech

[57] ABSTRACT

A fuel pump system with automated transaction processing enables a purchaser to define a plurality of fuel pump transactions by selecting various transaction parameters that define the transaction and store the predefined transactions on a storage medium (e.g. on an identification card bearing a magnetic strip). Then, at a fuel pump, the purchaser can pass the identification card through a magnetic card reader that reads the stored transaction information and a controller can cause the stored transaction(s) to be displayed so that a purchaser can select a transaction for execution. The purchaser may enter a single input to select a transaction, thereby simplifying and further expediting the transaction and automated processing thereof. The transaction parameters may include one or more of the form of payment (debit card, credit card, etc.), where the transaction is to be executed (e.g. at the pump or "inside"), the type and grade of fuel to be purchased (e.g. regular unleaded, premium unleaded, diesel etc.), the amount of fuel to be purchased (e.g. dollar amount, number of gallons, or fill-up) and whether or not a receipt should be printed upon completion of the transaction.

20 Claims, 3 Drawing Sheets

FUEL PUMP SYSTEM WITH AUTOMATED TRANSACTION PROCESSING

FIELD OF THE INVENTION

The invention relates to fuel pump systems with automated transaction processing, and more specifically to such systems where a purchaser defines and stores transactions, and when the purchaser desires to execute a transaction, the stored information is read and a transaction menu including menu choices for the predefined transactions is displayed so that the purchaser can select one of the predefined transactions for execution.

BACKGROUND OF THE INVENTION

Some fuel pumps are provided with a magnetic card reader for enabling automatic payment processing at the pump upon completion of a sale. This reduces the number of employees needed at a service station to process payments and reduces the time necessary for a purchaser to consummate a transaction. Thus, existing fuel pump systems having this feature help the speed and efficiency of processing fuel purchase transactions. However, various drawbacks exist.

For example, with existing systems, a number of preliminary steps usually must be performed by the purchaser before the purchaser can begin pumping fuel. Typically the purchaser must select a form of payment (credit card, debit card, cash, etc.) by pressing a key of a keypad associated with the fuel pump. In some systems, this includes choosing whether to "pay-at-the-pump" or to pay inside (via an attendant). If the purchaser selects the pay-at-the-pump option, then the purchaser typically must next pass a debit or credit card through a magnetic card reader. After the card has been read, the purchaser may be required to press another key to select the type of fuel to be purchased, usually by pressing a button on the fuel pump or sometimes just by lifting the nozzle for the desired type of fuel. The purchaser also is typically prompted to elect whether or not a receipt should be printed upon completion of the transaction. Sometimes this is done after the desired amount of fuel has been pumped. Then, the purchaser pumps the fuel, manually stopping the pump at the desired amount or waiting for automatic cut-off (e.g. if the fuel tank is to be filled-up). When the desired amount of fuel has been pumped, the purchaser replaces the nozzle and the transaction processor determines the amount of the sale and processes the transaction in a known manner. If a receipt is to be printed, the processor prints a receipt and the transaction is completed. Communication links between the processor and one or more central controllers are typically used to process payment information in a known manner. Various inefficiencies exist with these types of fuel pump transaction processing systems.

By way of example, each time a purchaser desires to purchase fuel, a number of selections and inputs must be made by the purchaser. Thus, existing automated transaction processing systems require the purchaser to select the transaction parameters each time fuel is purchased. This is inefficient, especially in cases where a purchaser typically uses the same or at least some of the same parameters from one transaction to the next. For example, many purchasers either want a receipt or they do not. For many people, at least some, if not all, of these choice does not vary from one transaction to the next. For example, many people purchase the same type of fuel each time and often pay for the purchase in the same way each time (e.g., using a particular credit card). In some cases, a purchaser may have a preference for the amount of fuel purchased or may routinely fill-up. In situations such as these, where a purchaser often repeats at least some parameters from one transaction to the next, it is inefficient to require the purchaser to select these repeated parameters for each transaction. Other drawbacks also exist.

SUMMARY OF THE INVENTION

It is an object of the present invention to overcome these and other drawbacks of the prior art.

It is another object of the present invention to improve the efficiency of existing fuel pump systems having automated transaction processing.

It is another object of the present invention to provide a fuel pump system that enables a purchaser to define a plurality of transactions associated with pumping fuel, store the transactions on a storage medium, and subsequently select one of the plurality of stored transactions for execution at a fuel pump.

It is another object of the present invention to provide a fuel pump system with automated transaction processing, where the fuel pump comprises a display for displaying a transaction menu customized for an individual purchaser or account, based at least in part on transactions predefined by the purchaser.

It is another object of the invention to provide a fuel pump system where transactions are completed with a reduced number of inputs from the purchaser at the time the transaction is executed.

It is another object of the invention to provide a purchaser controlled, menu-driven fuel pump system that facilitates a large number of menu choices.

It is another object of the invention to provide a fuel pump system with an automated transaction processor that automatically stores transactions, including purchaser selected transaction parameters and/or other transaction data on a storage medium for use in subsequent transactions or for performing other functions.

It is a further object of the invention to provide a fuel pump system where a single purchaser identification card contains information concerning a plurality of the purchaser's accounts and that enables a purchaser to perform transactions using a selected one of a plurality of the accounts.

It is yet a further object of the invention to provide a fuel pump system with an automated transaction processor with a display that enables transaction selections to be made from a single display screen, as opposed to a series of screens that each enable one transaction parameter to be selected by a purchaser.

According to one embodiment, the present invention includes a fuel pump system with automated transaction processing comprising: at least one fuel pump capable of selectively enabling controlled amounts of one or more types of fuel to be pumped by a purchaser; a transaction processor operatively connected to the fuel pump for processing transactions involving the pumping of fuel from the fuel pump; a purchaser identification mechanism operatively connected to the transaction processor for identifying a purchaser based on purchaser identification information; a storage medium for storing, and associating with the purchaser identification information, one or more purchaser-defined transactions comprising stored transaction parameters; a display operatively connected to the transaction processor for displaying a transaction menu, including the purchaser-defined transactions; and an input mechanism operatively connected to the transaction processor for enabling the purchaser to select one of the displayed transactions, where the transaction processor receives from the input mechanism an indication of the purchaser-defined transaction to be executed and is operable to enable the execution and automated processing of the transaction.

According to one embodiment of the present invention, a purchaser defines a plurality of transactions by selecting transaction information, including transaction parameters that define the transaction, and stores the predefined transactions and parameters on a storage medium (e.g., on a card bearing a magnetic strip). When the purchaser desires to execute a transaction, the stored information is read (e.g., by passing the magnetic card through a magnetic card reader), and this information is provided to a controller of a transaction processor. The controller causes a transaction menu including choices relating to the stored transaction(s) to be displayed on a connected display so that a purchaser can select one of the options to enable a desired transaction to be executed. Preferably, the purchaser enters a single input to select a transaction, thereby simplifying and further expediting the transaction and automated processing thereof.

The stored transaction parameters predefined by the purchaser may include one or more of: the form of payment (e.g., debit card, credit card, cash, prestored value card, etc.); where the transaction is to be paid for (e.g., at-the-pump or inside); product information (e.g. the type and grade of fuel to be purchased (e.g., regular unleaded, premium unleaded, diesel, etc.)); the amount of product to be purchased (e.g., a dollar amount, a number of gallons (or liters of fuel), or "fill-up", etc.); and whether a receipt should be printed upon completion of the transaction. Other desired or necessary purchaser selected transaction parameters may also be incorporated depending on the nature of the transaction.

Transaction data, which may include the purchaser selected transaction parameters and other transaction data not defined by the purchaser (e.g., the price per gallon, the day, date, time and location of the transaction, the name of the service station and/or the total amount paid, etc.) may be recorded for subsequent use. Additionally, data not necessary for execution of the fuel purchase transaction may be entered by the purchaser at the time the transaction is executed and used by the processor and/or stored (e.g., on the card) for future use. For example, for a fuel purchase transaction, the purchaser may enter, via an input mechanism, the odometer reading of the vehicle into which fuel is being pumped. Entry of this type of data, in combination with transaction data, can enable the processor to perform tasks such as calculating fuel efficiency, establishing a fuel purchase log, etc. While this aspect of the invention may be used with a magnetic card, an EEPROM or Smart Card may be beneficial. Thus, at least three types of data may be used and/or stored when a transaction is executed. These types of data include transaction parameters predefined or selected by the purchaser, transaction data not predefined or selected by the purchaser but which is necessary for execution of the transaction and data not necessary for the transaction itself.

According to one embodiment of the present invention, a purchaser identification mechanism comprises an identification (ID) card reader/writer and an ID card for each of the purchasers. Various transaction parameters for different transactions are defined by a purchaser and stored on the ID card. When it is desired to effect a transaction, the ID card is read by the card reader and the transaction processor causes a transaction menu to be displayed for that purchaser based on the read information. Then the purchaser selects a transaction for execution. In this way, the transaction is implemented with a reduced number of entries by the purchaser at the time of execution of the transaction.

According to one embodiment, one or more customized purchaser-defined transactions are stored on a storage medium, the information is subsequently recalled when the purchaser desires to execute a transaction and a menu containing choices corresponding to one or more of the purchaser-defined transactions is displayed. Preferably, these transactions may be selected by an input technique such as touching a single key of a keypad, touching an area of the display corresponding to the desired transaction (e.g., if a touch sensitive screen is used), touching a single key adjacent the menu entry (e.g., if input keys are located adjacent display areas), by using a "point-and-click" device associated with the transaction processor or by other input methods.

According to another embodiment, the purchaser may define and store a plurality of transactions whereby payment is handled by a selected one of a plurality of different accounts of the purchaser. The different accounts may be different accounts at a single institution or accounts with different institutions. To facilitate this, a single ID card may be used to store the information for different accounts. Thus, one universal card can be used by an individual to enable execution of transactions with payment made from a selected one of a plurality of different accounts stored on a single medium.

According to other features and aspects of the invention, the purchaser identification, transaction definition and/or selection of menu choices may be implemented, in whole or in part, by voice recognition. Purchaser identification may also be implemented, in whole or in part, by fingerprint verification, eye scanning or other physical characteristics of the purchaser. If the transaction parameters include the amount of fuel to be purchased, the controller may operate to automatically turn off the fuel pump when the selected amount of fuel has been pumped.

Other features and objects of the invention will be apparent from the drawings and the detailed description of the invention set forth below.

DETAILED DESCRIPTION OF THE PREFERRED EMBODIMENTS

Figure 1:
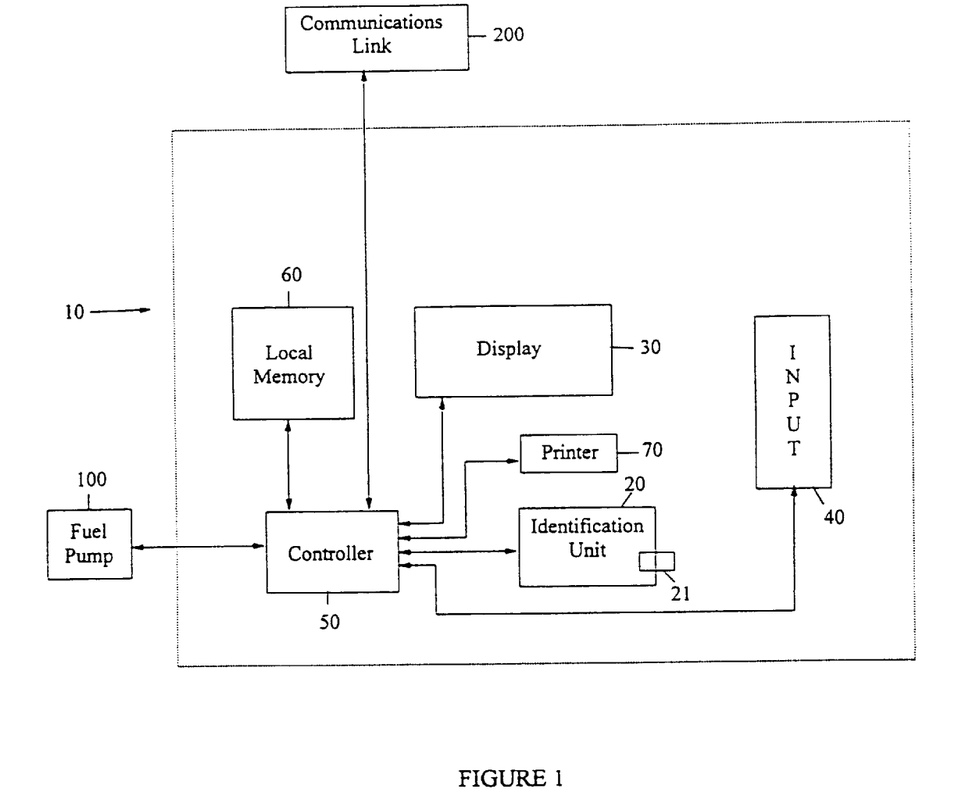
FIG. 1 is a schematic illustration of a fuel pump system with a transaction processor according to one embodiment of the present invention.

FIG. 1 schematically illustrates a fuel pump system with automated transaction processing according to one embodiment of the present invention. The system comprises at least one fuel pump 100 and at least one transaction processor, generally indicated as 10. The fuel pump 100 may be any suitable fuel pump (e.g. the types commonly found at service stations). For example, the fuel pump may comprise one or more nozzles, each connected to a hose or other conduit, which in turn is connected to a pump and a supply of a type and grade of fuel (not shown). The transaction processor 10 preferably comprises at least an identification unit 20, a display 30, at least one input device 40, a controller 50, a local memory 60 and a printer 70. If the identification unit 20 is a card reader/writer (for simplicity referred to hereafter as a "card reader"), then an identification card 21 is preferably used to identify the purchaser and to provide other information as detailed below. A communications link 200 is provided to enable the controller to communicate with other components commonly used in an automated transaction processing system. The general mechanical structure and operation of fuel pumps are well known and for simplicity will not be described. Transaction processor systems as communications protocols for fuel pumps per se are also generally known. For simplicity, the details of such systems will not be provided.

According to one embodiment of the present invention, the identification unit 20 comprises a card reader (e.g., a magnetic card reader) and prior to execution of a transaction, purchaser-defined transactions) are stored on an ID card 21 bearing a magnetic strip. Magnetic cards per se are well known, as are methods for storing information thereon and reading information therefrom. When a purchaser desires to execute a transaction at a fuel pump, the purchaser passes ID card 21 through magnetic card reader 20 and information stored thereon is read and passed to controller 50. The information read from the magnetic card 21 may include information relating to the identity of the purchaser, account information, stored transaction information and other information. Upon identification (and, if desired, verification by entry of a PIN or other data), the controller 50 uses stored transaction information read from the card 21 to cause the display 30 to display one or more transaction menus customized for that purchaser. Preferably, the transaction menu options are displayed on a single screen and includes choices corresponding to one or more of the stored purchaser-defined transactions. Other choices may be provided as discussed below. Preferably, the menu will have a menu choice for a "standard menu" that enables the purchaser to elect to manually enter transaction parameters (such as is ordinarily performed using existing transaction processors). Unless indicated otherwise, the term menu includes a single screen display comprising one or more choices or a series of screen displays each comprising one or more choices. By use of an input mechanism 40, the purchaser can select one of the stored transactions for execution, preferably by making a single input. For example, if the purchaser's card has five stored transactions, information sufficient to identify the five transactions may be displayed on display 30. For example, the transactions may be numbered from 1–5. By touching a single key of an input mechanism (e.g. a keypad), the purchaser may select a transaction for execution. If the purchaser selects one of the stored transactions, the selected transaction is executed without the need for further inputs, selections or entries by the purchaser, thereby minimizing the number of selections, inputs or entries required by a purchaser at the time of execution of a desired transaction. Alternatively, the purchaser also may be prompted for one or more additional inputs, selections or entries.

Figure 3:
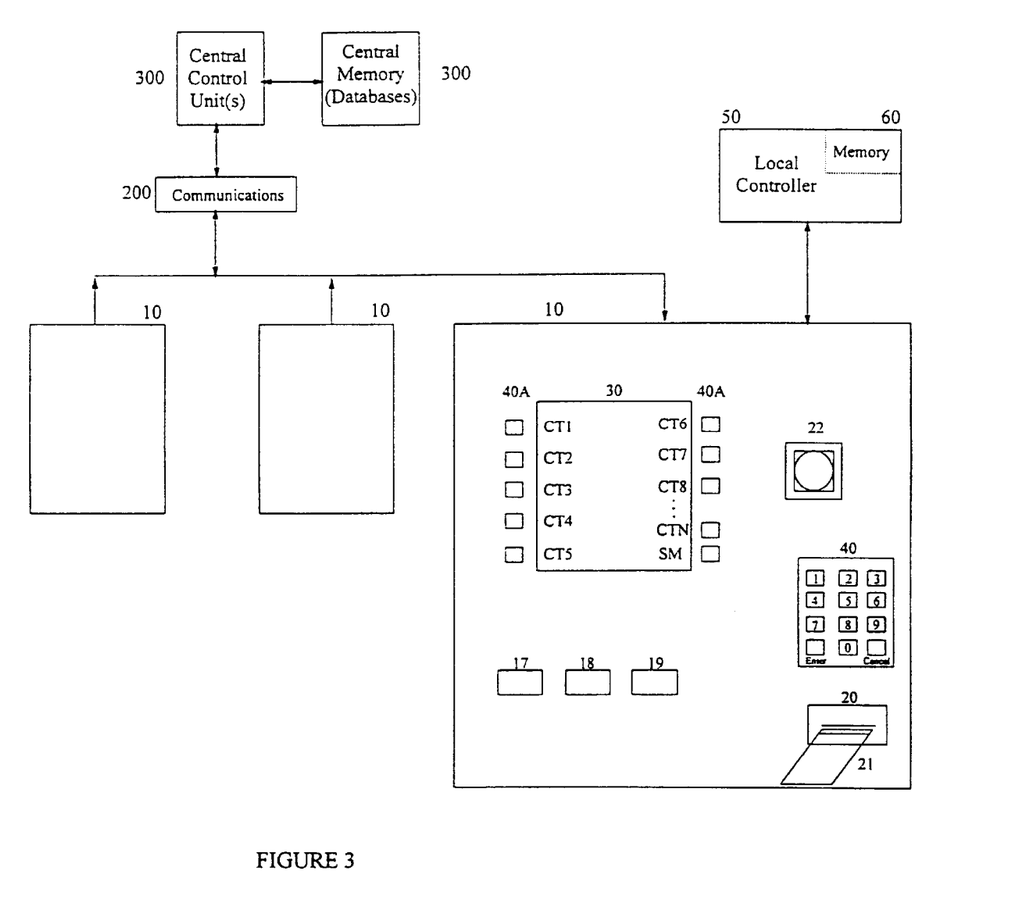
FIG. 3 is a schematic illustration of a transaction processing system according to one embodiment of the present invention.

As shown for example in FIG. 3, the transaction menu preferably comprises a display of a description of at least some of the purchaser-defined transactions and may include (custom transaction identifiers (CT1–CTN) and an option to display a standard menu SM. Preferably, there is an alphanumeric (or other) identifier next to each menu item. Alternatively, a plurality of keys 40A may be located adjacent the displayed transactions to enable a desired transaction to be selected or a touch screen display may be used so that the purchaser can touch the description of the desired transaction. For example, the first menu choice may be "purchase $10 of regular unleaded with payment from a Primary Checking account (linked to an ATM)-no receipt." The number "1" may appear next to the description of this menu choice as a transaction identifier. To execute this transaction the purchaser merely touches the "1" key on the keypad (and optionally hits "ENTER"). This selection is received by the controller 50 which enables the selected transaction to be executed. This minimizes the number of selections/key entries a purchaser must perform to execute a routine transaction. Thus, by defining a transaction once and storing it, the transaction can be used repeatedly without the need for the purchaser to enter all of the transaction parameters each time the purchaser desires to execute the transaction. Various alternatives also may be used to implement the various aspects of the present invention, some of which are discussed below.

As shown in FIG. 3, a plurality of processors 10 may be connected via communications link 200 to one or more central control units 300 and central memories 400. The transaction processors 10 may also have a receipt printer 17, a currency acceptor 18 for receiving cash for payment and a dispenser 19 for dispensing currency for change or cash back. Additionally, selections and other functions can be performed by use of a point-and-click device 22 which is connected to controller 50. Pointing device 22 may be used to position a cursor on the display 30 to point to selections or functions. One or more control buttons associated with the pointing device may be used to click on a selection or function for execution. Pointing devices per se are known, but they are not known to have been used in this environment.

Figure 2:
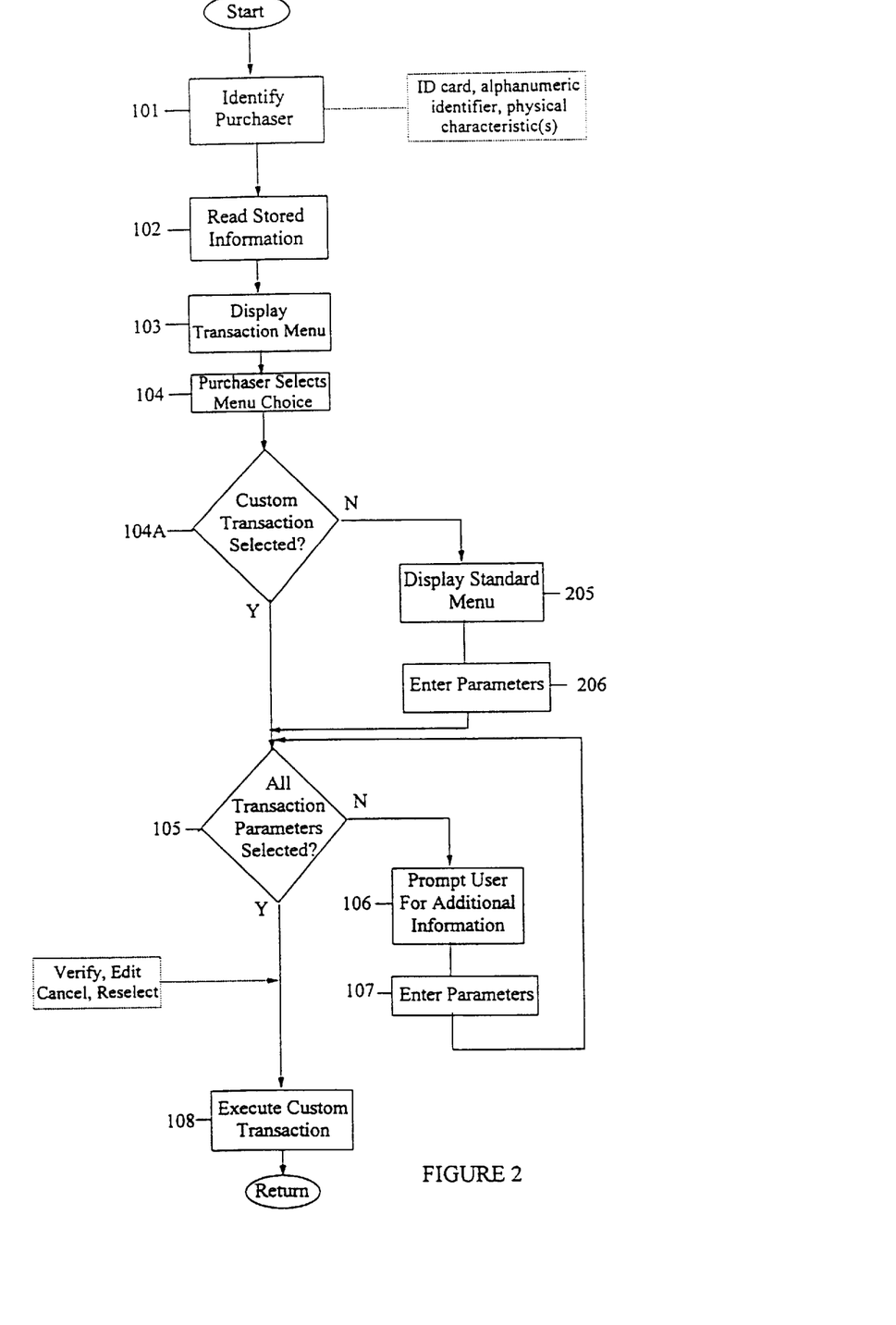
FIG. 2 is a flow chart illustrating the execution of a transaction according to one embodiment of the present invention.

FIG. 2 is a flow chart illustrating the operation of one preferred embodiment of the present invention. For purposes of this description, it is assumed that a purchaser has already defined one or more customized transactions and that this information is stored on the purchaser's ID card (or in a memory of the system). Other preliminary steps may also be performed if desired. Moreover, for simplicity, the well known steps associated with the local controller communicating with a central controller via communications link 200 are omitted.

In step 101 the purchaser is identified. This may be accomplished in a number of different ways, including by use of an ID card (e.g., a magnetic storage card), by entering an alphanumeric identifier using a keypad of the transaction processor, by physical characteristics of the purchaser (e.g., by voice recognition, fingerprint recognition, eye scanning, by other identification techniques) or by a combination of two or more such techniques. Other preliminary steps such as entering a PIN, etc. may also be performed (not shown). In step 102, stored information associated with the identified purchaser is read and provided to the controller. This information preferably includes the stored transaction information. In step 103, the controller causes the display to display a transaction menu comprising at least one custom transaction option based, at least in part, on the information read in step 102. The transaction menu preferably comprises choices (e.g. CT1–CTN of FIG. 3) for one or more transactions predefined by the purchaser. Optionally, one menu item includes a choice for the purchaser to select a "Standard Menu" (e.g. SM of FIG. 3). The Standard Menu preferably corresponds to the type of menu typically used with existing fuel pump transaction processors. Next, the purchaser selects one of the displayed menu items (Step 104) and the controller determines if it is one of the custom transactions (Step 104A). As discussed herein, a variety of different mechanisms may be used to select a displayed menu item. If the controller determines that a custom transaction was not selected in step 104, then according to one embodiment, a Standard Menu is displayed (step 205).

If a custom transaction was selected in step 104, depending on the type of transaction selected, the selected transaction may be performed without further action by the purchaser. Preferably, if a custom transaction was selected in step 104, the controller determines if all necessary transaction parameters have been selected (step 105). If the selected custom transaction contains all of the necessary information, the controller causes the transaction to be executed based on the stored information (step 108). If not, the controller may cause the display to prompt the purchaser to enter additional information (step 106) and the purchaser may enter the additional parameter(s) (Step 107) and control returns to Step 105. For example, if the selected transaction specifies the type of fuel, the account from which payment should be made and whether a receipt should be printed, but not the amount, the purchaser may be prompted to enter the desired amount for the transaction. One advantage of this technique, for example, is where a purchaser pumps the same type of fuel, pays from the same account, and is consistent in wanting or not wanting a receipt, but varies the amount of purchase. In this case, the purchaser could set up a custom transaction that stores information to pump an amount (to be entered) of a particular type of fuel, to pay be the selected account and print (or not) a receipt. Then, all the purchaser needs to do to execute this transaction, is to select this custom transaction and enter the amount for that transaction. This reduces the number of inputs and selections the purchaser must make to execute a transaction.

Also, it may be desirable after selection by the purchaser of a transaction (step 104), or at step 105, that the controller causes the transaction parameters to be displayed on a display with a prompt for the purchaser to verify that this is the desired transaction to be executed. If the transaction parameters are as desired, the purchaser may verify this by one of the input techniques described herein or other input techniques. Preferably, the display may also give the purchaser options to cancel the transaction, edit the parameters thereof (and if desired store the edited transaction), reselect a transaction or other desired options.

Returning to step 205, in response to a Standard Menu being displayed, the purchaser is prompted to select the transaction parameters in conventional manner (step 206). Once all of the necessary transaction information is selected (and any verification has occurred) then control passes to step 108 and the transaction is processed. If the purchaser selects an amount of fuel to be purchased, this information can be sent by the controller to the fuel pump to cause the pump to automatically turn-off when the selected amount has been pumped. Various other features, aspects and alternatives to the structures and methods described above may be used in accordance with the present invention. Some of which are now discussed.

Purchaser Identification

Purchaser identification is preferably implemented by a purchaser identification technique such as insertion of an ID card (unique to each purchaser or account) into or through a card reader. Preferably the ID card comprises a storage medium, for example, a generally plastic card having the ability to store information although the invention is not so limited. The ID card 21 may comprise a magnetic storage medium, an optical storage medium or may be an IC card, a "smart" card or an EEPROM card. Other types of cards may be used as well. The identification unit 20 preferably comprises a reader/writer for reading from/writing to the storage medium.

For simplicity, various embodiments of the invention have been and will be described with reference to an ID card 21 having a magnetic strip located thereon. For example, the ID card 21 may comprise at least one magnetic strip for magnetically storing information. The card reader/writer is then preferably a magnetic card reader suitable for reading a magnetic card, such as a credit card, a debit card or an automated teller machine (ATM) card. The actual mechanics of storing information on and reading information from a magnetic card (and other types of cards) is generally known and will not be described here. Alternatively, or in addition, the ID unit 20 may be capable of identifying a purchaser based on physical characteristics. For example, the ID unit 20 may comprise a fingerprint ID unit, a voice recognition unit, an eye scanner or other types of physical characteristic detectors. A keypad, other types of ID units or combinations of the foregoing techniques may be used. For example, if a fingerprint (or voice) identification unit is provided, the purchaser may be identified by simply entering an appropriate finger into the fingerprint identification unit (or speaking into the voice identification unit), whereby the unit then reads the input information and compares this read information to previously stored identification information to determine the identify of the purchaser. The stored information may be stored on a card or a local memory and/or central memory of the fuel pump system. To facilitate this, each purchaser may be required to provide the necessary fingerprint (other or physical identification) information at the time of activation of an account, upon execution of a transaction (or at other convenient times).

According to one embodiment, the identification information may be initially stored in a central memory. However with a large number of authorized purchasers it may take some time to find a match between input identification information and stored information. An alternative is to store such information in a local memory of each system that the purchaser accesses, as such accesses occur. This would build up a local memory capability for each system that the purchaser accesses. If this approach is used, when the purchaser enters the physical purchaser identification information (e.g. voice or fingerprint), the local memory of the system can be checked first to find a match with prestored information. If a match is found, it is likely to occur in less time than if the central system memory is used to find such a match due to the relative number of individual's information stored in the respective memories. If the purchaser has never used the particular terminal before, then no match will be found in the local memory and upon that determination, the local controller may cause a search of the central memory to occur. According to another aspect of this embodiment, an institution (e.g. a gas company or franchisee) having multiple service stations, may download purchaser identification information to each of its systems or each of the systems accessed by the purchaser so that the purchaser can rapidly perform transactions via any of that institutions' systems. This or similar identification techniques could avoid the need for a purchaser to carry an identification card.

Universal Identification Card

According to another embodiment of the present invention, the ID card may be used as a "universal" card to avoid the need for a purchaser to carry a number of different ID cards such as ATM cards and/or credit or debit cards.

According to this embodiment, information for a plurality of accounts may be stored on a single card. The transaction menu may include transactions for a plurality of different accounts and/or financial institutions. For example, a universal card may have information stored thereon for a purchaser's VISA card(s), American Express card(s), department store card(s), casino card(s), gasoline credit card(s) and one or more bank ATM cards. The card may store information to enable a purchaser to execute one or more transactions with one or more selected institutions with which the purchaser has a financial relationship or is authorized to transact business with. For some institutions, the purchaser may have more than one account. All of the information necessary to enable the purchaser to perform a transaction with any of these institutions or accounts may be stored on a single card. If this feature is used, the stored transaction information may include the purchaser-defined transaction information identified above along with an identifier of the institution and the desired account for which the transaction should be performed. For example, such a stored transaction may include a transaction to "Purchaser $10 of Regular Unleaded-Pay by Visa-Print Receipt."

If no card is used, once the purchaser is identified (or before), the purchaser may enter institution information to identify an institution with which the purchaser is identified. This may be accomplished by entering (e.g., via a keypad) an institution identification code, selecting an institution from a menu that is displayed based on information stored in the system or by storing such information in the system (locally and/or centrally) in association with purchaser identification. Once the purchaser and account is identified, then verification information may be entered (e.g., a PIN) by the purchaser for the selected institution or account and transactions may be executed as described herein.

Stored Information

According to one aspect of the invention, the information stored (e.g., on the ID card 21) may include one or more financial institution identifiers, one or more account identifiers, authorization information, including (for example, a PIN), and other desired information that is typically used on an ATM, debit, credit or other similar cards. Preferably, the ID card 21 may also be used to store transaction information relating to purchaser-defined transactions specified for a particular purchaser or account. For example, the information may include transaction parameters such as product information (e.g., the type and grade of fuel), quantity information (e.g., the amount of fuel), the form of payment, where payment should be made (e.g., at the pump or inside) and whether a printed receipt should be generated. Preferably, the stored transaction information includes information sufficient to enable a desired transaction to be completed with little or no additional transaction parameter selections necessary by the purchaser at the time of execution. The transaction information is preferably individually selected by the purchaser and stored (e.g. before executing a transaction) to enable transactions to be more easily executed by a purchaser and to enable the same (or similar) transactions to be performed multiple times without the need to re-enter all or most of the transaction parameters each time a purchaser wants to execute a transaction.

Alternatively, one or more global transaction parameters may be selected and stored and may be used with each transaction unless overridden by the purchaser. For example, the purchaser may decide that he/she typically does not want a receipt to be printed. The purchaser may select and store "no receipt" as a global transaction parameter so that the controller will not cause the printer to print a record of an executed transaction upon completion of the transaction. If any global transaction parameters are used, they may be considered as default choices which will be used unless the purchaser specifically overrides that choice for a particular transaction. Other global transaction parameters may also be used. For example, while a purchaser is defining a transaction, the display may query the purchaser whether any of the parameters should be designated as a global transaction parameter.

According to one embodiment, a transaction identifier and corresponding transaction information is stored on the ID card. Preferably, information corresponding to one or more transactions is stored. If desired, one card may be used to store information for more than one account for a single purchaser. These multiple accounts may be with one or more institutions or entities with which the purchaser is associated. Therefore, separate pluralities of purchaser-defined transactions may be stored for separate accounts. For example, if a magnetic card is used, the transaction information for a particular account at a particular financial (or other) institution may be stored on one (or more) magnetic strip(s) on the ID card. Each transaction preferably is stored with a transaction identifier and all or most of the information necessary to complete a transaction. If such a universal card is used, the purchaser may be first prompted to select the account/institution with which a transaction is to be executed. Then, the custom transaction for that account/institution may be displayed (along with other choices as described herein). Alternatively, the custom transactions may specify as a parameter one of the specified accounts/institution to be used in processing the transaction.

Transaction Parameters

According to another embodiment, less than all of the transaction parameters necessary to define a transaction may be preselected and stored, with the remaining transaction parameter(s) for that transaction being selected at the time a transaction is executed.

For example, it may be desirable to store only most of the transaction parameters necessary to execute a transaction. For example, the stored partial transaction may be "Purchase $10 of unleaded; pay by ATM from primary checking-no receipt." Then, upon display of this item on the purchaser customized menu and selection of it by a purchaser, the purchaser may select the type of unleaded fuel to be purchased (e.g. premium or regular). This option is generally useful one or more transaction parameters may vary but some or many of the transaction parameters are repeated.

Storage Methodology

Consistent with the foregoing, instead of or in addition to storing purchaser-defined transaction information on the ID card, such information may be stored in the local memory of one or more transaction processors or in a central memory or memories of the overall system. Storage of such information in a local memory may be particularly useful where a purchaser frequents a particular service station.

The purchaser-defined transactions may be stored on the ID card upon activation of the ID card, added by a purchaser upon execution of a transaction, or stored automatically based on the purchaser's execution of a transaction (e.g., by writing some or all of the transaction parameters to the ID card after a purchaser manually enters a transaction). Alternatively, these transactions may be stored in a memory of the fuel pump system (for example in a local memory associated with a controller of one or more processor or in a central memory), along with association of purchaser identifier information and may be recalled at the time a purchaser desires to effect a transaction. According to another feature of the invention, if a purchaser executes a transaction that is not already stored (on the ID card, locally in the transaction processor or globally in the system), upon completion of the transaction, the card reader/writer may write the transaction or transaction parameters to the card (or local memory of the terminal and/or central memory of the network), or a prompt may be displayed to ask the purchaser if the transaction should be stored on the identification card so that it can subsequently appear on the customized menu. If the purchaser desires to do so, the transaction information may be stored as a new purchaser-defined transaction on the ID card. Alternatively, or in addition to this, the purchaser customized menu may include an option to enable the purchaser to change the stored transactions. This preferably includes the ability to modify or delete an existing stored transaction and the ability to add a new transaction. If the transaction is stored, it may be stored with a designation as being a "Recent Transaction."

Recent Transactions

According to one embodiment of the invention, one or more Recent Transactions options may be displayed on the customized menu. Alternatively, a menu option may be "Display Recent Transactions." If this is selected, a predetermined number of the purchaser's most recent transactions may be displayed and may be selected for execution. The input mechanism may be designed to facilitate scrolling through recent transactions. For example, up/down keys may be provided on a keypad. Alternatively, according to one aspect of the invention a pointing device, such as a point-and-click device 22 (FIG. 3) may be used as further described herein. The use of a pointing device is especially advantageous if it is desired to provide menus with a relatively large number of choices to facilitate scrolling through pages of the memory and pointing to and selecting one of the choices. Other advantages of using a pointing device also exist.

Menu

Preferably, the menu includes choices corresponding to one or more of the stored purchaser-defined transactions and/or stored recent transactions. Other choices may be provided as discussed below. Preferably, the customized menu also will have a menu choice that enables the purchaser to select a standard menu for that account and/or financial institution (e.g., a menu that enables a purchaser to perform any transaction that may be performed using the transaction processor) and not just the stored purchaser-defined transactions.

Upon the purchaser's selection of a desired menu choice, the associated transaction is then executed without the need for further inputs or selections by the purchaser or with limited additional inputs or selections, thereby reducing or minimizing the number of selections, inputs or entries required by a purchaser to execute a desired transaction. According to another feature, after a customized menu is displayed and a purchaser selects one of the transaction options from the menu, a more detailed description of the transaction may be displayed to enable the purchaser to verify the desired transaction. For example, some or all of transaction type and transaction parameters may be displayed. Additionally, transaction data (e.g. the price per gallon and/or total price for the transaction may be displayed).

Preferably, according to another aspect of the present invention, all of the transaction parameters necessary to define a transaction are displayed on a single screen. For example, the screen may comprise a plurality of sections with each section providing a mechanism for the user to choose at least one of the transaction parameters. Object oriented or graphical tools may be used to facilitate this. For example, the screen may comprise a plurality of list boxes (e.g., one for the method of payment, one for where payment is to be made, one for whether a receipt should be printed, one for the amount of fuel, etc.). By use of an input technique, for example, by use of a pointing device to point to and click on the desired parameters, the purchaser can select all of the necessary parameters from a single screen.

Controller

The controller may be any generally known controller capable of use with a transaction processor. It may be programmed to cause operation in the manner described herein. Various controllers suitable for use with automated transaction processors for fuel pumps are currently known.

Input

The various purchaser inputs and selections described herein may be accomplished by the touch of a single key (or combination of keys) of the keypad, by touching a designated area of the display (e.g., if a touch sensitive screen is used), by touching a single input key adjacent to the transaction identified or by other input methods. In various circumstances, one or more of these types of input mechanisms may be advantageous over another.

According to another embodiment of the invention, the transaction processor is provided with a pointing device such as a point-and-click device, a trackball or similar device to facilitate (and enhance) selection and/or input of desired transactions, functions, parameters, menus or other choices. The use of such a pointing device can facilitate a number of other features. For example, with the use of such a device, a purchaser may point to a menu item and click or double click on it for selection or execution. Alternatively, or in addition thereto, the pointing device may be used to select a "custom transaction" menu choice that causes a controller to cause the display of a transaction menu with a list of predefined transactions to be displayed, in one or more columns, to enable one of the predefined transactions to be selected. Further, the list may extend for more than one page of the display and the pointing device can be used to scroll up, down, left or right through the list and to select the desired transaction for execution. To facilitate this, the display may have a graphical interface using object-oriented programming with, for example, a list box that can be scanned by use of the pointing device.

According to this embodiment, the pointing device is operatively connected to the controller and is located in a purchaser accessible location. The movement of the pointing device by a purchaser can then cause a cursor (or similar identifier) on the display to be moved to a desired position on the display and a button (or similar control) may be used to enable a menu, transaction or transaction parameters to be selected in a known manner.

ID Card

Preferably, one or more purchaser-defined transactions stored on the ID card 21 are read by a card reader/writer 20 after the purchaser inserts the card into the card reader/writer 20. The information may be read before and/or after the purchaser enters verification data (e.g., a personal identification number or PIN). The stored information may be read once and stored in a local memory of the transaction processor or read from the card 21 as and when needed, if the card is retained in the card reader/writer 20 during use.

If the card reader retains the card during use, upon insertion of the card into the card reader or upon selection of the transaction identifier, the corresponding transaction information may be read from the card and used to execute the selected transaction. If a "dip" or "swipe" card reader is used, whereby the card is entered and withdrawn before selecting a transaction or passed through an external reader (i.e., it is not retained in the card reader during execution of a transaction), then the stored transaction information may be read and stored in a local memory of the processor so that upon selection of a transaction identifier by the purchaser, the corresponding transaction information may be read from the local memory and used to execute the selected transaction. If desired, this latter method may be used even if the card is retained in the reader during use.

Additional Data

If desired, the purchaser may be able to enter data that is not necessary for the automated transaction processing of the transaction. For example, during the transaction, the purchaser may enter the odometer reading from the vehicle into which the fuel is being pumped. This data can be stored on the card along with transaction data (e.g., the number of gallons of fuel pumped) to create a log that can be viewed or to automatically calculate (and store if desired) fuel efficiency information. Other types of data not necessary for the automated transaction processing of the purchase of fuel may also be entered and/or stored before, during or upon completion of a transaction. The data may be subsequently used to enable additional functions to be performed.

Other Uses

Various features of the invention may be used in a variety of electronic transaction processing systems other than fuel pumps. Such systems may include ATMs, POS terminals (e.g. supermarket or retailer checkouts, gas pumps, etc.), travelers check dispensers, self-service airline ticket dispensers, coupon dispensers, gaming devices (e.g., slot machines or other "casino games"), lottery machines (e.g., if the purchaser plays the same or similar numbers for each drawing), check cashing machines, etc. In the case of airline ticket purchase transactions (and other transactions for which "frequent flyer" miles are awarded) the transaction parameters may include information about one or more of the purchaser's frequent flyer accounts.

The foregoing is a description of various aspects of the preferred embodiments and features of the present invention. However, the invention is not so limited. Various other alternatives consistent with the invention will be apparent to one of ordinary skill in the art in light of the foregoing description of the present invention. The scope of the invention is only limited by the claims appended hereto.

I claim:

1. A fuel pump system with automated transaction processing comprising:

purchase unique storage medium for storing at least one purchaser-defined transaction;

at least one fuel pump; and at least one transaction processor operatively connected to the fuel pump for automated processing of transactions involving the purchase of fuel from the fuel pump, the at least one transaction processor including:

reader means for reading information stored on the storage medium, including the purchaser-defined transaction information;

display means for displaying a transaction menu comprising at least one choice corresponding to one of the purchaser-defined transactions;

input means for enabling a purchaser to select a transaction from the transaction menu; and control means for processing the selected transaction.

2. The system of claim 1 where the input means comprises at least one of: a key of a keypad; a portion of the display means; and a pointing device.

3. The system of claim 1 further comprising identification means for identifying a purchaser prior to execution of a transaction.

4. The system of claim 3 where the display means displays a transaction menu customized for the identified purchaser.

5. The system of claim 4 where the transaction menu comprises at least one choice for a stored purchaser-defined transaction and one choice for a standard menu.

6. The system of claim 3 where the identification means comprises at least one of a card reader and means for identifying a purchaser based on a physical characteristic of the purchaser.

7. The system of claim 6 where the means for identifying a purchaser based on a physical characteristic of the purchaser comprises at least one of: a fingerprint identification device; a voice recognition unit; and an eye scanner.

8. The system of claim 1 further comprising means for storing transaction data relating to an executed transaction.

9. The system of claim 8 where the transaction data comprises at least one of: the price of the fuel; the day, date and time of the transaction; the location of the transaction; and the total purchase price for the transaction.

10. The system of claim 8 further comprising means for storing data not necessary for executing a transaction for the purchase of fuel.

11. The system of claim 10 wherein at least some of the transaction data and data not necessary for executing a transaction for the purchase of fuel are used to generate information relating to one or more of the purchaser's transactions.

12. The system of claim 11 where the transaction data comprises the amount of fuel purchased during a transaction, the data not necessary for executing a transaction comprises an odometer reading of a vehicle into which fuel is pumped, and the information relating to the purchaser's transactions comprises fuel efficiency information for the vehicle.

13. The system of claim 1 further comprising means for storing purchaser selected data not necessary for executing a transaction for the purchase of fuel.

14. The system of claim 13 where the data comprises an odometer reading of a vehicle into which fuel is pumped.

15. The system of claim 13 where the control means controls the fuel pump to automatically turn off the fuel pump when the specified amount of fuel has been pumped.

16. The system of claim 1 where the purchaser-defined transaction comprises a transaction parameter specifying the amount of fuel to be pumped.

17. The system of claim 1 where the means for storing comprises at least one of a magnetic storage medium, an optical storage medium, and a smart card.

18. A fuel pump system with automated transaction processing comprising:

at least one fuel pump capable of selectively enabling controlled amounts of one or more types of fuel to be pumped;

a transaction processor, operatively connected to the fuel pump, for processing transactions involving the pumping of fuel from the fuel pump, said transaction processor comprising:

a controller;

means for communicating with the controller and storing one or more purchaser-defined transactions comprising purchaser selected transaction parameters;

a display, operatively connected to the controller, for displaying transaction information, including purchaser-defined transactions; and input means, operatively connected to the controller, for enabling the purchaser to select one of the purchaser-defined transactions;

wherein the transaction controller receives from the input means an indication of the purchaser-defined transaction to be executed and is operable to enable the transaction to be executed according to the transaction parameters associated with the selected transaction.

19. The system of claim 18, wherein the transaction information comprises at least one of: a form of payment; where payment is to be made; purchaser account information; a type of fuel to be pumped; an amount of fuel to be pumped and whether a printed record of the transaction should be printed upon completion of the transaction.

20. In a fuel pump system with automated transaction processing, a method comprising the steps of:

(a) storing at least one purchaser-defined transaction relating to the purchase of fuel;

(b) reading the at least one stored purchaser-defined transaction;

(c) displaying a transaction menu comprising at least one of the purchaser-defined transactions;

(d) selecting a transaction from the transaction menu;

(e) pumping fuel; and (f) automatically processing the transaction.

* * * * *